United States Patent
Behr et al.

(10) Patent No.: US 10,052,686 B2
(45) Date of Patent: Aug. 21, 2018

(54) METHOD FOR IDENTIFYING A CAST PART

(71) Applicant: Nemak, S. A. B. de C.V., Garcia (MX)

(72) Inventors: Thorsten Behr, Schmelz (DE); Matthias Ghodstinat, Dillingen (DE)

(73) Assignee: Nemak, S.A.B. de C.V., Nuevo Leon (MX)

( * ) Notice: Subject to any disclaimer, the term of this patent is extended or adjusted under 35 U.S.C. 154(b) by 0 days.

(21) Appl. No.: 15/551,462

(22) PCT Filed: Feb. 2, 2016

(86) PCT No.: PCT/IB2016/000076
§ 371 (c)(1),
(2) Date: Aug. 16, 2017

(87) PCT Pub. No.: WO2016/132196
PCT Pub. Date: Aug. 25, 2016

(65) Prior Publication Data
US 2018/0036795 A1 Feb. 8, 2018

(30) Foreign Application Priority Data

Feb. 18, 2015 (DE) .................. 10 2015 102 308

(51) Int. Cl.
B22D 17/22 (2006.01)
B22D 19/00 (2006.01)
(Continued)

(52) U.S. Cl.
CPC .............. *B22D 19/04* (2013.01); *B22C 9/10* (2013.01); *B22C 23/00* (2013.01);
(Continued)

(58) Field of Classification Search
CPC ...... B22D 17/2245; B22D 19/00; B22C 23/00
(Continued)

(56) References Cited

U.S. PATENT DOCUMENTS

| 4,900,637 A | 2/1990 | Darovec | |
|---|---|---|---|
| 5,465,780 A * | 11/1995 | Muntner | B22C 9/04 164/369 |
| 6,220,333 B1 * | 4/2001 | Cantwell | B22D 17/2245 164/229 |
| 6,582,197 B2 * | 6/2003 | Coulson | B22C 7/02 164/122.1 |

(Continued)

FOREIGN PATENT DOCUMENTS

| DE | 102007035144 A1 | 1/2009 |
|---|---|---|
| DE | 202008018295 U1 | 9/2012 |

(Continued)

OTHER PUBLICATIONS

Meissner et al. "Verfahren zur Markierung von Gussteilen wahrend des Urformprozesses", Giesserei, Jun. 2009, pp. 52-61, vol. 96, No. 6.

*Primary Examiner* — Kevin E Yoon
(74) *Attorney, Agent, or Firm* — The Webb Law Firm

(57) ABSTRACT

A method for the production of castings which are permanently provided with readable information. An identification element, which has an information surface, provided with information, and a casting surface which is assigned to the casting and also provided with information, is arranged on a casting mould surface assigned to a mould cavity of a casting mould so that the information surface is covered, while the casting surface is exposed in the mould cavity. A metal melt is poured into the mould, so that, during casting or solidification of the metal melt, a firmly bonded, form-fit or force-fit connection of the identification element to the casting is produced. The information on the casting surface is reproduced in the manner of a stamp on surface of the casting. The casting is then removed from the mould and fettled.

15 Claims, 7 Drawing Sheets

(51) Int. Cl.
*B22D 23/00* (2006.01)
*B22D 19/04* (2006.01)
*B22C 23/00* (2006.01)
*B22C 9/10* (2006.01)
*B22D 31/00* (2006.01)
*B22D 45/00* (2006.01)
*B22D 46/00* (2006.01)
*B29C 45/37* (2006.01)

(52) U.S. Cl.
CPC ......... *B22D 17/2245* (2013.01); *B22D 19/00* (2013.01); *B22D 31/00* (2013.01); *B22D 45/00* (2013.01); *B22D 46/00* (2013.01); *B29C 45/37* (2013.01)

(58) Field of Classification Search
USPC .................................. 164/4.1, 229; 249/109
See application file for complete search history.

(56) References Cited

U.S. PATENT DOCUMENTS

| | | | |
|---|---|---|---|
| 8,846,216 B2* | 9/2014 | Jabado | B22D 19/00 164/498 |
| 2001/0022774 A1 | 9/2001 | Cantwell | |
| 2002/0114701 A1 | 8/2002 | Coulson | |
| 2013/0220567 A1 | 8/2013 | Jones et al. | |

FOREIGN PATENT DOCUMENTS

| | | |
|---|---|---|
| EP | 0363791 B1 | 12/1992 |
| EP | 2196272 B1 | 4/2012 |
| EP | 2025433 B1 | 8/2012 |
| JP | 50017018 A | 2/1975 |
| JP | 04-075761 A | 3/1992 |
| JP | 2001300690 A | 10/2001 |
| JP | 2002283000 A | 10/2002 |
| WO | 2009140950 A2 | 11/2009 |

* cited by examiner

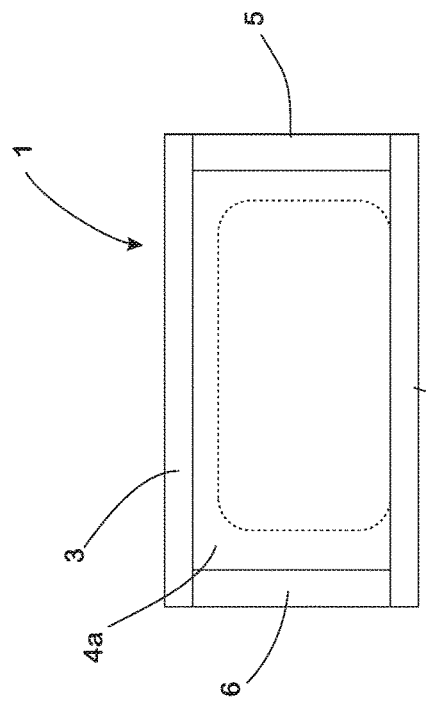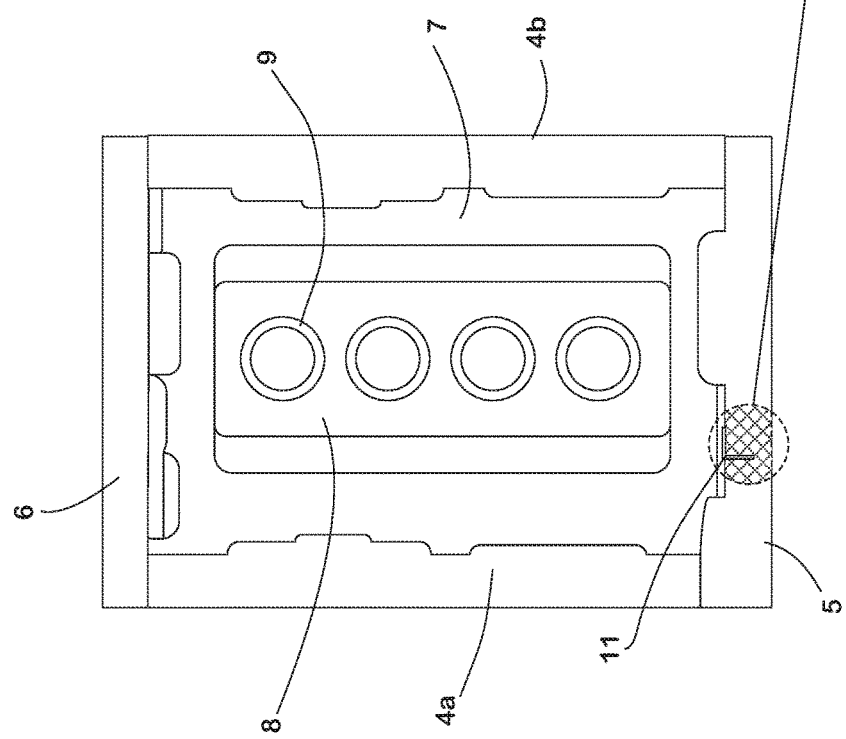

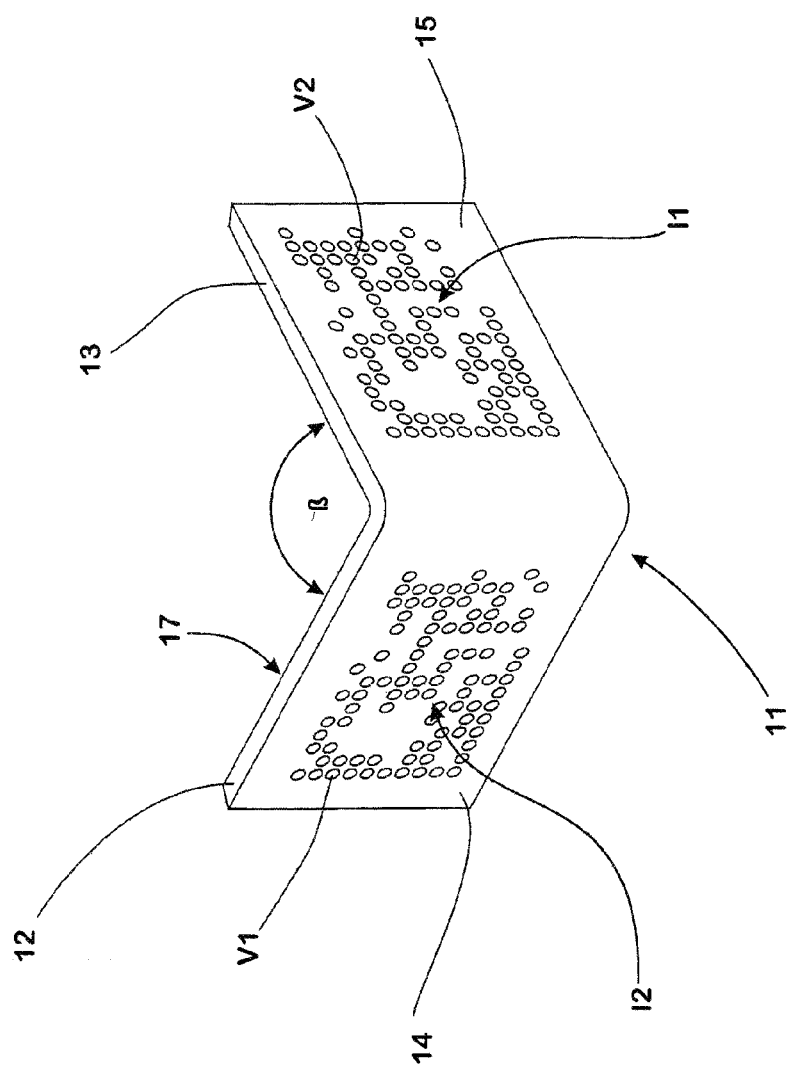

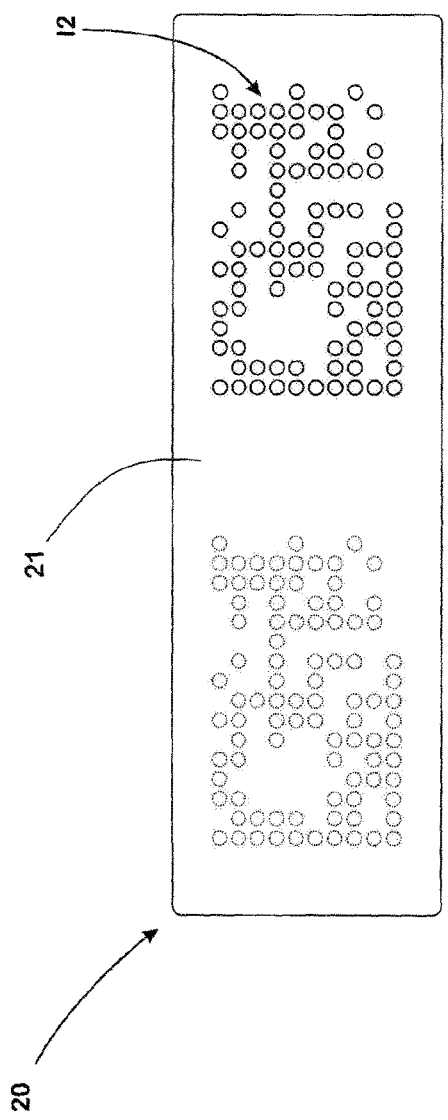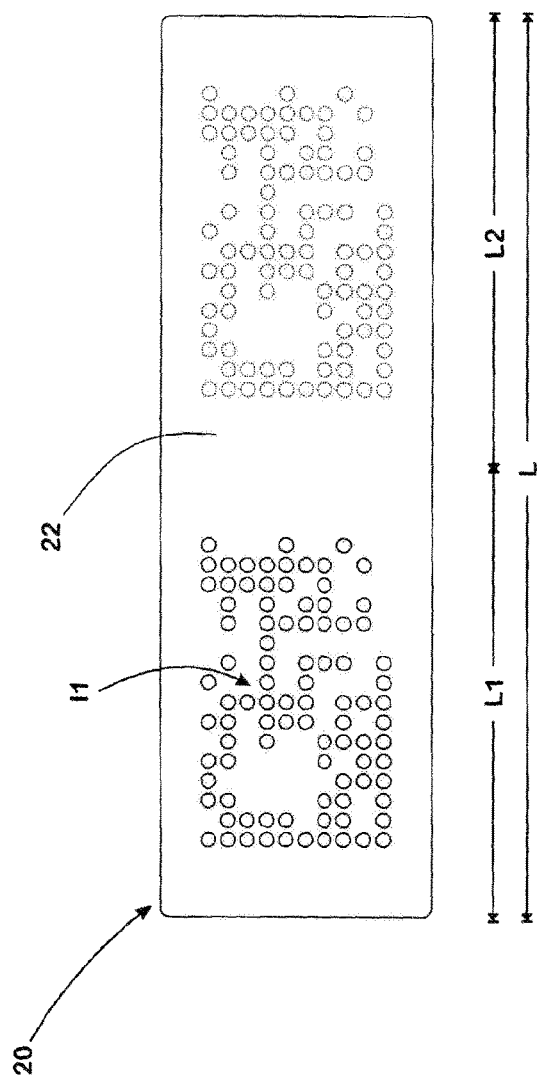

METHOD FOR IDENTIFYING A CAST PART

CROSS-REFERENCE TO RELATED APPLICATIONS

This application is the United States national phase of International Application No. PCT/IB2016/000076 filed Feb. 2, 2016, and claims priority to German Patent Application No. 10 2015 102 308.3 filed Feb. 18, 2015, the disclosures of which are hereby incorporated in their entirety by reference.

BACKGROUND OF THE INVENTION

Field of the Invention

The invention relates to a method for producing a casting provided with readable information.

Description of Related Art

Here, the castings produced according to the invention include components commonly produced by casting which are completely solidified and have been removed from the mould. Castings of the type produced according to the invention are therefore free of the mould parts required to cast them, such as risers, gates, inlets, seams and suchlike, as are usually removed after solidification by a subsequent processing step which in the technical language is also called "fettling".

The castings produced according to the invention in particular are components for producing internal combustion engines. Therefore, cylinder heads and crankcases specifically designed for internal combustion engines are among the castings produced according to the invention.

Increasingly higher requirements are imposed on the quality of work pieces of the type in question here which are highly stressed in practical use. This relates both to their mechanical properties and to their dimensional stability. Since the quality of a casting is critically influenced by the production process, it is therefore increasingly more important to keep track of the different process steps undergone during the production of cast work pieces and assign them to the respective cast part. Here, full knowledge and traceability of all determining factors which are critical in the production process and which could have an effect on the quality or performance characteristics of the respective cast product is sought. Such traceability of production data individually assigned to each casting allows determined production deficiencies to be learnt from and corresponding corrections to the production process to be carried out. In this way, the process can be continually optimised.

In this respect, important production data are, for example, the production date, pouring rate, casting temperatures, type of production plant etc.

One way known from the prior art of attaching information with the required depth of detail to the casting necessary to uniquely individualise the respective casting entails providing a foundry core, which is used in a casting mould for casting cavities, channels or the outer contour of the casting, with a negative image of a unique character string by means of a laser, this unique character string being reproduced on the casting body in the course of the casting process and being visible after casting.

Information reproduced on the casting can be captured in the casting process using an automatically operating device, as for example described in JP 04 075761.

A simple way of identifying a casting is proposed in EP 0 363 791 B1, in which directly after casting a tag containing information about the respective casting is placed on the surface of the melt which is still free-flowing such that it floats there and protrusions on it reach into the melt. After solidification, the tag then adheres tightly to the obtained casting. However, for this procedure a larger surface section of the melt poured into the casting mould has to be freely available. This requires an open casting mould, which with many modern casting processes is not possible.

In order to solve this problem, in EP 2 196 272 B1 it was proposed to prefabricate a code carrier serving as an identification element and then moulded this code carrier with at least one section into the riser or another mould part of the casting blank obtained after solidification and removal from the mould. In this way, the code carrier is inseparably joined to the casting blank. The information contained on it can be easily captured and for example in a data processing device automatically assigned to the respective casting. However, the unique identification of the casting blank made possible by the code carrier is lost again when, in the course of fettling, those mould parts—and with them the code carrier attached to one of them—which although they are required for casting are not required as functional parts of the finished casting are separated from the casting.

SUMMARY OF THE INVENTION

Against this background, the object arose of providing a method which enables castings to be produced which are permanently provided with readable information, in particular also in the state which is ready for use.

In the case of the method according to the invention for producing a casting body provided with readable information the following production steps are therefore undergone a) providing and identification element,
   which on one side has an information surface provided with information and
   on another side has a casting surface which is assigned to the casting and on which information is also present;

b) arranging the identification element in a casting mould which defines a mould cavity shaping the casting to be cast, wherein the identification element is arranged in such a way on a casting mould surface assigned to the mould cavity that the information surface is covered with respect to the mould cavity, while the casting surface of the identification element is assigned to the mould cavity such that it is exposed;

c) pouring a metal melt into the casting mould wetting the casting surface of the identification element with metal melt;

d) solidification of the metal melt to form the casting, wherein during casting or solidification a firmly bonded, form-fit or force-fit connection of the identification element to the casting is produced and the information present on the casting surface is reproduced in the manner of a stamp on the assigned surface of the casting during casting or solidification of the metal melt;

e) removing the casting from the casting mould;

f) fettling the casting.

What is crucial for the invention is that an identifying element is used which carries information on two different surfaces, that is to say, on the one hand, on a surface, namely the casting surface, which when the metal melt is poured into the casting mould comes into contact with the metal melt, so that the information present on the casting surface due to the contact with the metal of the casting is transferred onto the assigned surface of the casting in the manner of a stamp and is present there when the casting has completely solidified.

At the same time, a form-fit, firmly bonded or force-fit connection of the identification element to the completely solidified casting is produced.

This occurs, for example, by contact of the metal melt flowing into the mould cavity during casting with the casting surface itself, by flowing around or flowing against the section of the identification element on which the casting surface is formed or by mould parts and suchlike additionally provided on the identification element and also flowed against, filled or surrounded by metal melt.

The solidifying metal melt in this way embraces the identification element at least on its periphery and thus produces a form-fit and possibly also a force-fit connection. Depending on the type of material that the identification element consists of, additionally or alternatively fusing of the sections of the identification element wetted by the metal melt can occur, so that a firmly bonded connection between the casting formed from the metal melt and the identification element is produced.

The mould parts provided to support the connection of the identification element to the casting can be indentations, openings and channels formed into the identification element, which the metal melt penetrates when the mould cavity is filled with melt during casting. The mould parts can also be protrusions, ledges and suchlike which in the case of the identification element arranged in the casting mould project into the mould cavity and are enclosed by the melt entering the mould cavity during casting.

On the other hand, on another surface offset from the casting surface, namely the information surface, the identification element also carries information. The information surface is arranged remote from the casting surface and in such a way that when the identification element is positioned in the casting mould the information surface is sealed off with respect to the mould cavity and correspondingly when the mould cavity is filled does not come into contact with the metal melt or at most only to a slight extent which does not impair the readability of the information carried by it.

In the case of the approach according to the invention, the casting blank obtained after it has solidified and has been removed from the mould carries the identification element which is firmly connected to it and which reliably makes a precise and individual identification of the respective casting possible by means of the information present on its information surface which is now exposed.

The casting obtained after removal from the mould can now undergo the subsequent processing steps which are usually carried out for its completion. In particular, the casting can be fettled, in order to mechanically remove risers, inlets, gates, seams and adhering remains of the casting mould still present on it.

In the course of fettling, the casting is usually subjected to an abrasive blasting treatment, in which the casting is exposed to a jet of particles which hit the casting with high kinetic energy. During this process, although the exposed information surface of the identification element is also exposed to the targeted mechanical attack, so that the information reproduced on it is possibly destroyed, the casting surface abutting on the casting and the surface section of the casting covered by it and provided with the information transferred from the casting surface are protected against the abrasive blasting treatment by the section of the identification element on which the casting surface is present.

If in a last step of the fettling process the identification element is separated from the casting, then the casting carries the information transferred to it from the casting surface freely visible at the place previously covered by the casting surface of the identification element.

The approach according to the invention succeeds, therefore, in reproducing complex information on the finished casting, using very simple means, which permanently remains there and can be captured by any suitable automatic reading device.

Castings produced according to the invention can undergo all the production steps which are usually provided during production of such castings. Thus, the castings can undergo a heat treatment, in order to set their mechanical properties.

The method according to the invention is particularly suitable for those processes, in which the casting is cast in a casting mould which at least in the area of those of its surfaces on which the identification element is arranged consists of a foundry core. This foundry core can be produced in a way which is known per se from a moulding sand, a binder binding the moulding sand and moulding material containing optional additives and is destroyed after removing the casting. The method according to the invention is particularly suitable for casting castings in casting moulds which also in a way which is known per se are formed as a core package composed of a plurality of such foundry cores.

Any material whose temperature resistance is high enough that it retains its form when it comes into contact with the metal melt, and in which no reactions occur through contact with the metal melt, by means of which the properties of the metal melt or of the casting cast from it are permanently impaired, is suitable for producing the identification element used and designed according to the invention. In particular, the identification element can consist of sheet metal which is produced from steel or aluminium material.

The identification element can be strip-shaped. With this design, the surface of the one side of the strip forms the casting surface and the surface of the opposite side forms the information surface of the identification element. The information on the information surface is then arranged opposite the information on the casting surface of the identification element. The strip-shaped identification element can be arranged before casting in a simple way with its information surface flat and tight on a correspondingly flat surface of the casting mould.

If necessary, a slot can be provided in the casting mould, into which at least the section of the identification element which carries the information surface can be inserted in a form-fit manner or flush with the adjacent areas.

In order in the case of a strip-shaped identification element to have maximum possibilities with the structuring of the information, it can be advantageous to arrange the information on the information surface and on the casting surface of the identification element offset in relation to one another.

The latter is particularly advantageous if the information on the casting surface is embossed on the casting surface or impressed into the casting surface.

An embossed or impressed representation of the information respectively provided on the casting surface can be transferred to the casting in a particularly simple way by pressing the pattern present on the casting surface and representing a negative of the information to be transferred to the casting into the assigned surface of the casting. The impressing, shaping, engraving or application of the information provided on the information surface has the advantage that information represented in such a way is still readable over a sufficiently long period of time even after being subjected to abrasive stress, which frequently occurs in harsh casting operations.

However, it is also possible for the information to be applied to the casting surface or information surface using suitable colours or suchlike. The material of the information applied on the casting surface can be chosen such that on contact with the melt the transfer to the casting takes place.

Irrespective of how the transfer in individual cases takes place, the information is imprinted onto the casting via the casting surface of the identification element, in each case as with a stamp.

As an alternative to a strip-shaped design, the identification element can also be designed like an angle piece, in particular a sheet metal angle. If the casting surface is provided on the one leg of the angle piece and the information surface is provided on its other leg, then the positioning of the information surface, which is protected against wetting with melt, in the casting mould is particularly easy. Thus, the leg carrying the information surface can namely fit in a slot which is formed into the assigned surface of the casting mould.

If the respective surface of the casting mould is formed on a foundry core, the identification element can already during production of the foundry core be arranged on it, so that it retains its correct position when assembling the casting mould.

The information provided on the identification element can be machine-readable in a way which is known per se. Information of this type is, for example, applied to the identification element in the form of letter and other character strings, dots, dashes or hatching. They can be reliably recognised by an optical scanning system and allow, for example, a comprehensive information content to be stored in the form of redundant data which also then still enables the respective casting body to be uniquely identified if the information carried by the identification element is partly unreadable.

The information provided on the identification element can be represented in the manner of a Data Matrix Code (DMC). Inexpensive reading and writing devices are available on the market for this code standardized by the International Organization for Standardization (ISO).

However, other forms of coding which can be carried by an identification element provided according to the invention are also conceivable. Thus, instead of an optically-readable code, it is possible, for example, for a transponder coding which can be read by means of a suitable reading device to be provided, if the respective transponder is sufficiently heat-resistant or is protected during the casting process such that it does not overheat. Thus, the identification element can, for example, carry an RFID chip (Radio Frequency Identification) which can be read with radio waves without contact.

The separate prefabrication of the identification element provided according to the invention allows the identification element to be already provided with the machine-readable code outside the casting mould.

The arrangement of the machine-readable code on an identification element produced separately and then attached to the casting body in the course of the casting process allows codes to be used which comprise a comprehensive information content. Thus, the information stored on the identification element can consist of data, by means of which the date the casting was produced or the casting production parameters thereof can be determined. However, it is not absolutely necessary to store the data required for tracing the essential production parameters in the code carried by the identification element itself. Instead, in a corresponding procedure, it is sufficient if the code individualises the respective casting body in terms of a unique, distinctive identification. This identification can, for example, be a number from a consecutive range of numbers.

By individualising the respective casting in a sufficiently unique way, the casting can, for example, be assigned its full production history stored in a database. To that end, the casting, after it has been removed from the mould, can be identified by means of the information present on the information surface and the actual values of the operating parameters, which were applied during its casting and the subsequent treatment steps, in particular a heat treatment directly following solidification and accompanying the removal from the mould, can be assigned to it in a database.

Should the casting after its first unique identification undergo further production steps which could have an effect on its properties then, of course, with each process step which the casting undergoes, the data relating to the casting already stored in the data processing device can be amended by the related data.

BRIEF DESCRIPTION OF THE DRAWINGS

The invention is explained in more detail below with the aid of the figures illustrating an exemplary embodiment.

FIG. 1 schematically shows a casting mould in a lateral view;

FIG. 2 schematically shows the casting mould according to FIG. 1 in the open state in a partly broken open plan view;

FIG. 3 schematically shows an angular first identification element in a perspective view;

FIG. 7 schematically shows a strip-shaped second identification element in a frontal view of its one surface;

FIG. 8 schematically shows the identification element according to FIG. 7 in a frontal view of its other surface;

Figure 4:
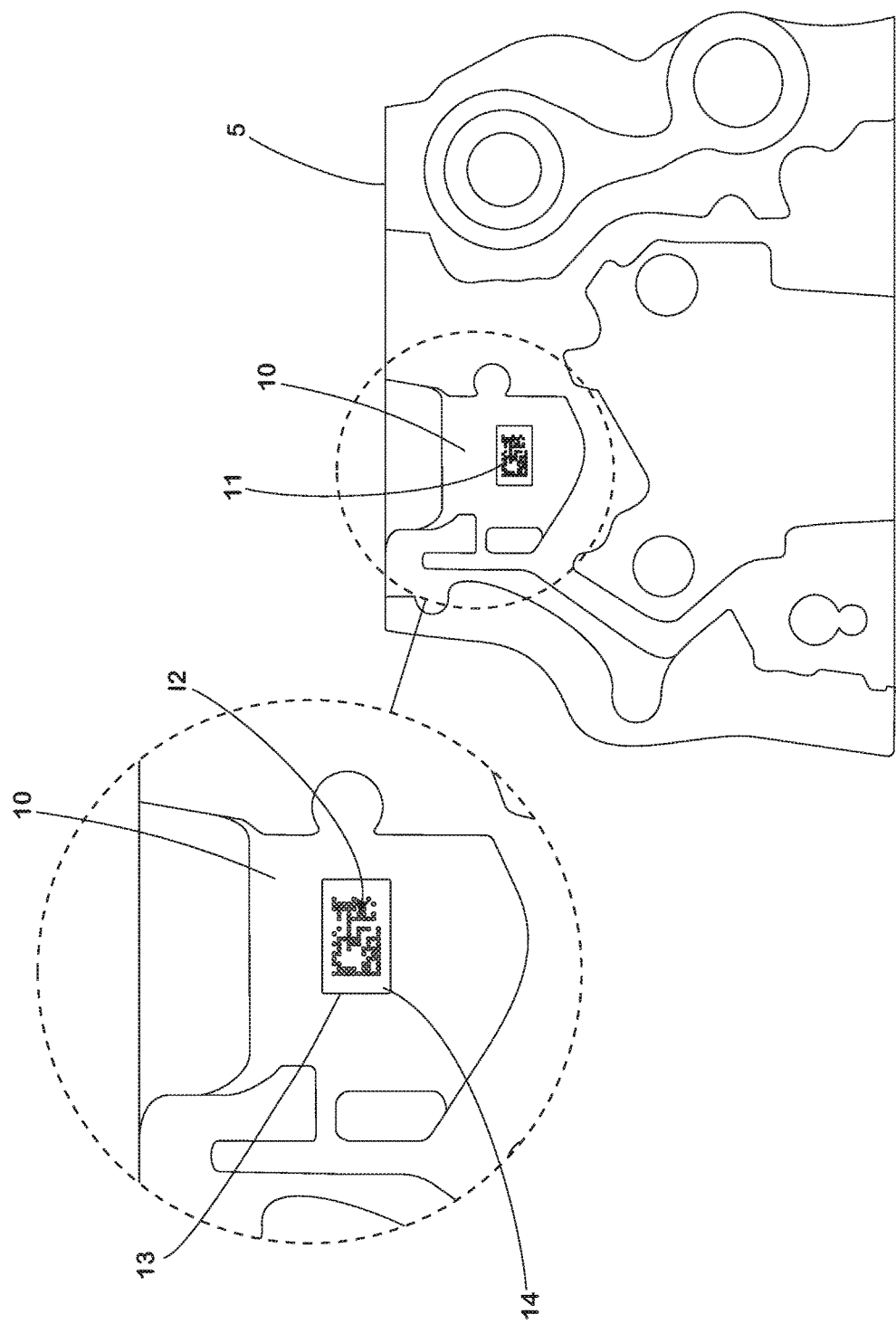
FIG. 4 schematically shows a front side wall core of the casting mould according to FIG. 1 with the identification element illustrated in FIG. 3 in a frontal view of its side assigned to the mould cavity of the casting mould.
Figure 5:
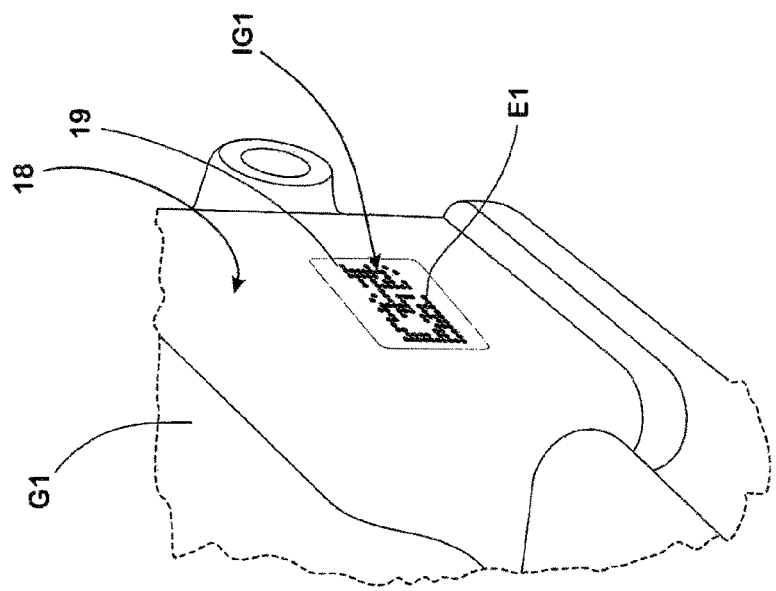
FIG. 5 schematically shows a section of the casting cast in the casting mould according to FIG. 1 provided with the front side wall core formed according to FIG. 4, before fettling, in a perspective view.
Figure 6:
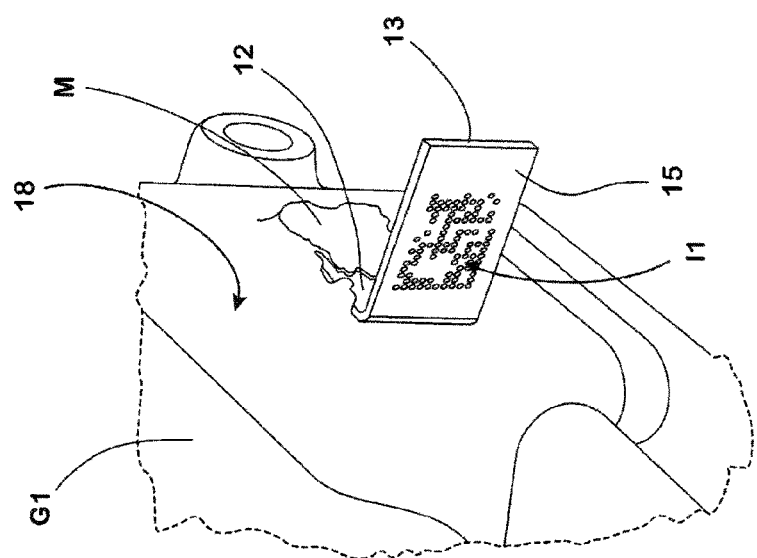
FIG. 6 schematically shows the section according to FIG. 5 after fettling.
Figure 9:
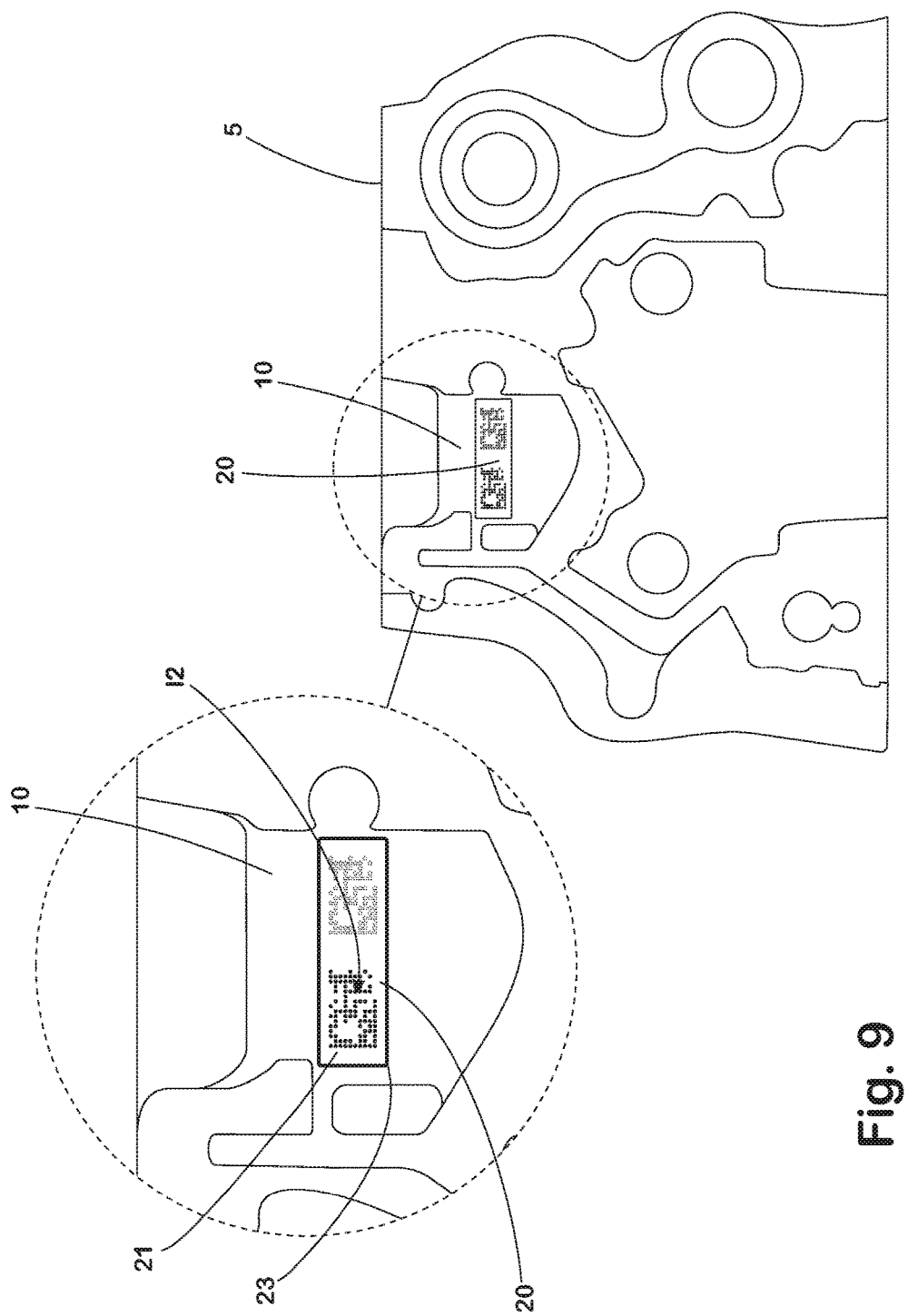
FIG. 9 schematically shows the front side wall core of the casting mould according to FIG. 4 with the identification element illustrated in FIGS. 7 and 8 in a frontal view of its side assigned to the mould cavity of the casting mould.
Figure 11:
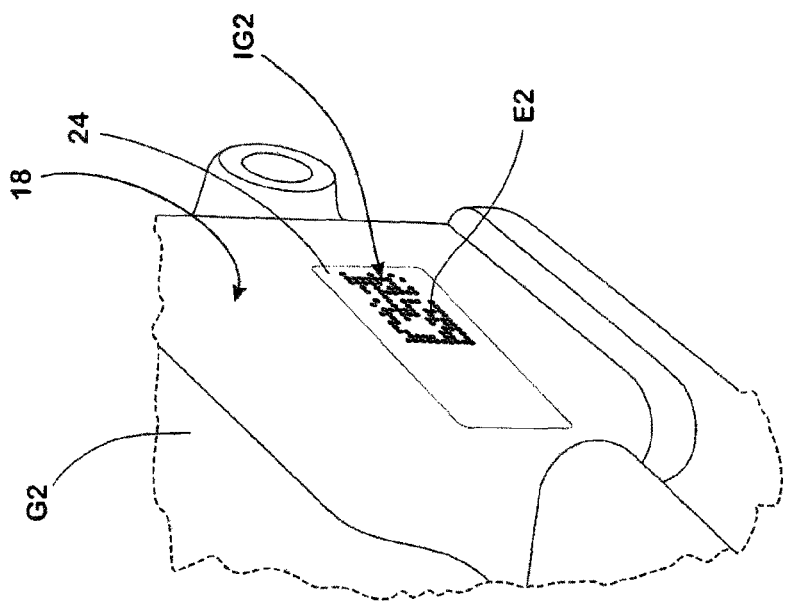
FIG. 11 schematically shows the section according to FIG. 10 after fettling.
Figure 10:
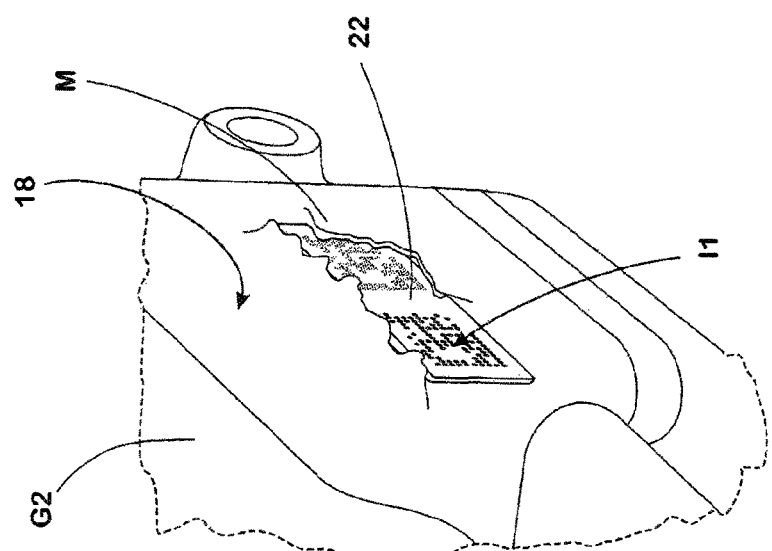
FIG. 10 schematically shows a section of the casting cast in the casting mould according to FIG. 1 provided with the front side wall core formed according to FIG. 9, before fettling, in a perspective view.

The casting mould 1 illustrated in FIG. 1 for casting a casting G1, G2, in which here the casting G1, G2 is a crankcase for an internal combustion engine, is formed in a conventional way as a core package having a bottom core 2, a top core 3, longitudinal side wall cores 4a, 4b and front side wall cores 5, 6. The cores 2-6 each illustrated here as a component can, of course, on the other hand, be composed of two or more single cores in a way which is known per se.

DESCRIPTION OF THE INVENTION

Additionally, risers, inlets, gates and suchlike, which for the sake of clarity are not illustrated here, are formed on the cores 2-6 of the casting mould 1, via which a mould cavity 7 enclosed by the casting mould 1 can be filled with metal melt. Here, the metal melt is a conventional aluminium casting alloy, for example.

Further foundry cores 8 and inserts 9 are arranged in the mould cavity 7, which form cylinders, oil channels and water channels etc. in the casting G1, G2, in a way which is also known per se.

The bottom core 2 of the casting mould 1 can be produced from a metal material and be reusable. On the other hand, the other foundry cores 3-6, 8 of the casting mould 1 are produced from moulding material known for this purpose and are destroyed when the casting G1, G2 is removed from the mould.

An identification element 11 formed like an angle piece, which was bent from a sheet steel strip, is arranged on a surface 10 of the front side wall 5 assigned to the mould cavity 7.

The identification element 11 has two legs 12, 13 which are arranged at right angles to one another and which each have a flat outer surface on their side facing away from the angle p enclosed between them. The outer surface of the leg 12 in question forms a casting surface 14 assigned to the mould cavity 7 and hence to the casting G1, G2 to be cast in each case, whereas the outer surface of the second leg 13 arranged at right angles to it forms an information surface 15. Information I1, I2 in each case coded as DMC is represented both on the casting surface 14 and on the information surface 15. The information I1, I2 is in each case represented by spherical cap-shaped depressions V1, V2 of approximately 1 mm in diameter impressed into the respective surface and arranged corresponding to the DMC coding.

Before the casting G1 is cast, the leg 13 of the identification element 11, which has the information surface 15 with the information I2, is embedded in a slot 16 formed into the surface 10 of the front side wall core 5. The leg 13 fits so perfectly into the slot 16 that no metal melt gets into the slot during casting and in particular the information surface 15 is not wetted with metal melt in the area where the information I2 is arranged there. At the same time, the leg 13 is pushed far enough into the slot 16 such that the other leg 12 of the identification element 11 abuts as tightly as possible with its surface 17 facing away from the casting surface 14 on the surface 10 of the front side wall core 5.

The metal melt flows around the leg 12 of the identification element 11 when the metal melt is poured into the mould cavity 7 of the casting mould 1, so that, on the one hand, the depressions V1 formed into the casting surface 14 as information I1 are filled with metal melt and, on the other hand, the metal melt encompasses the edges of the leg 12.

The metal melt filled into the casting mould 1 starts to solidify at the latest at the end of casting.

Before the casting G1 has completely solidified, the casting mould 1 can already, in a way which is known per se, be conveyed into a heat treatment furnace, in which the heat supply promotes the disintegration of the casting mould 1 and, at the same time, the casting G1 is heat treated. Of course, the casting G1 can also solidify in any other way and be subsequently removed from the mould.

After the casting G1 has solidified and has been removed from the mould, the identification element 11 sits tightly on the surface 18 of the casting G1, which is formed by the surface 10 of the front side wall core 5 on the casting G1. An at least form-fit hold of the identification element 11 is, at the same time, secured by solidified metal melt M which during casting has flowed around the edges of the leg 12 and has partly run behind the leg 12 and in this way has embraced the leg 12. In contrast, the leg 13 carrying the information I1 on its information surface 15 has remained unwetted by the metal melt. Correspondingly, the information I1 can now be easily captured by a corresponding reading device, which is not shown here, and all process data required for quality assurance and for tracing errors can be assigned to the casting G1 in a database by means of the information I1.

Afterwards, the casting G1 undergoes a subsequent mechanical treatment ("fettling"), in which, in a way which is known per se, the remains of the casting mould adhering to it, the mould parts required for casting, but not necessary for the function of the casting, as well as unavoidable seams at joint locations of foundry cores, and suchlike, are removed from the casting G1. The casting G1 is subjected to a subsequent sand blasting treatment, in which the identification element 11 is also separated from the casting G1 and the surface section 19 of the casting G1 lying underneath it, which until then had been covered by the leg 12 with its casting surface 14 abutting on the casting G1, is exposed.

The information I1 previously represented on the casting surface 14 by the depressions V1 impressed there is now permanently reproduced in a corresponding pattern of dot-like elevations E1 on the surface section 19. The information IG1 formed in this way on the casting G1 can at any time be re-read, so that even after a long service life of the casting G1, it can still be precisely determined how the casting G1 was produced and which process parameters were set in the course of this.

In contrast to the above mentioned production of the casting G1, in the case of the production of the casting G2 a strip-shaped identification element 20, which was also produced from sheet metal material, was used.

The one surface of the identification element 20 serves as the casting surface 21, whereas the surface present on the opposite side of the identification element 20 serves as the information surface 22. The information surface 22 and the casting surface 21 are divided into two longitudinal halves L1, L2 in relation to the longitudinal extension L of the identification element 20. The information surface 22 carries the information I1 assigned to it in its longitudinal half L1, whereas the casting surface 21 carries the information I2 assigned to it in its longitudinal half L2. In relation to the longitudinal extension L, the items of information I1, I2 of information surface 22 and casting surface 21 are therefore offset in relation to one another. As with the identification element 11, the items of information I1, I2 are represented by depressions V1, V2 formed into the respective surface 21, 22.

The identification element 20 is also arranged on the surface 10 of the front side wall core 5. To that end, in this case a slot 23 is formed into the surface 10 there, the shape and dimensions of which are adapted to the identification element 20 such that the identification element 20 sits tightly on the flat base surface of the slot 23 and the edges of the identification element 20 can be penetrated easily by the melt flowing against the identification element 20 during casting.

After casting and solidification of the metal melt to form the casting G2, the solidified cast metal embraces the edges of the identification element 20, so that it is also at least by means of a form-fit held securely and tightly on the cast part G2 after removal from the mould. The information I2 present on the casting surface 21 of the identification element 20 now sitting tightly on the casting G2 has, as with the casting G1, been stamped into the surface section 24 of the casting G2 covered by the identification element 20, whereas the information I1 provided on the now uncovered information surface 22 of the identification element 20 is exposed and can be captured by a reading device.

During subsequent fettling of the casting G2, the identification element 20 is also removed and, as a result, the surface section 24 of the casting G2 previously covered by it is exposed with the information IG2 reproduced on it and represented by elevations E2.

Therefore, using the invention, a method is available, by means of which castings G1, G2 can be produced which are permanently provided with readable information IG1, IG2. For this purpose, an identification element 11, 20, which on one side has an information surface 15, 22 provided with information I1, I2 and on another side has a casting surface 14, 21 which is assigned to the casting G1, G2 and is also provided with information I1, I2, is arranged on a casting mould surface 10 assigned to a mould cavity 7 of a casting mould 1 in such a way that the information surface 15, 22 is covered, while the casting surface 14, 21 of the identification element 11, 20 is exposed in the mould cavity 7. Then, a metal melt M is poured into the casting mould 1 wetting the casting surface 14, 21, so that during casting or solidification of the metal melt M a firmly bonded, form-fit or force-fit connection of the identification element 11, 20 to the casting G1, G2 is produced and the information I1, I2 present on the casting surface 14, 21 is reproduced in the manner of a stamp on the assigned surface 18 of the casting G1, G2. Finally, the casting G1, G2 is removed from the casting mould 1 and fettled in the conventional way.

REFERENCE SYMBOLS

1 Casting mould for casting a casting G1, G2
2 Bottom core of the casting mould 1
3 Top core of the casting mould 1
4a, 4b Longitudinal side wall cores of the casting mould 1
5, 6 Front side wall cores of the casting mould 1
7 Mould cavity of the casting mould 1
8 Foundry cores of the casting mould 1
9 Inserts of the casting mould 1
10 Surface of the front side wall 5 assigned to the mould cavity 7
11 Identification element
12, 13 Legs of the identification element 11
14 Casting surface of the identification element 11
15 Information surface of the identification element 11
16 Slot in the surface 10
17 Surface of the leg 12 facing away from the casting surface 14
18 Surface formed by the surface 10 of the front side wall core 5 on the casting G1
19 Surface section of the casting G1 covered by the leg 12 with its casting surface 14 abutting on the casting G1
β Angle between the legs 12, 13
E1 Elevations representing the information IG1
G1 Casting
I1, I2 Information
IG1 Information on the casting G1
M Solidified metal melt
V1, V2 Depressions
20 Identification element
21 Casting surface of the identification element 20
22 Information surface of the identification element 20
23 Slot
24 Surface section of the casting G2 covered by the identification element 20
E2 Elevations representing the information IG2
G2 Casting
IG2 Information of the casting G2
L Longitudinal extension of the identification element 20
L1, L2 Longitudinal halves of the identification element 20.

The invention claimed is:

1. A method for producing a casting provided with readable information, comprising the following production steps:
   a) providing an identification element,
      which on one side has an information surface provided with information and
      on another side has a casting surface which is assigned to the casting and on which information is also present;
   b) arranging the identification element in a casting mould which defines a mould cavity shaping the casting to be cast, wherein the identification element is arranged in such a way on a casting mould surface assigned to the mould cavity that the information surface is covered with respect to the mould cavity, while the casting surface of the identification element is assigned to the mould cavity such that it is exposed;
   c) pouring a metal melt into the casting mould wetting the casting surface of the identification element with metal melt;
   d) solidifying the metal melt to form the casting, wherein during casting or solidification a firmly bonded, form-fit or force-fit connection of the identification element to the casting is produced and the information present on the casting surface is reproduced in the manner of a stamp on an assigned surface of the casting during casting or solidification of the metal melt;
   e) removing the casting from the casting mould; and
   f) fettling the casting.

2. The method according to claim 1, wherein the identification element is removed in the course of a subsequent treatment of the casting.

3. The method according to claim 1, wherein the casting undergoes a heat treatment.

4. The method according to claim 1, wherein the casting undergoes a subsequent mechanical treatment, in which the casting is acted upon mechanically.

5. The method according to claim 1, wherein the identification element is a sheet metal strip.

6. The method according to claim 5, wherein the information on the information surface is arranged opposite the information on the casting surface of the identification element.

7. The method according to claim 6, wherein the information on the information surface and on the casting surface of the identification element are arranged offset in relation to one another.

8. The method according to claim 1, wherein the identification element is a sheet metal angle.

9. The method according to claim 8, wherein the identification element has the casting surface on one leg and has the information surface on another leg.

10. The method according to claim 1, wherein at least one of the items of information provided on the identification element is machine-readable.

11. The method according to claim 10, wherein the machine-readable information consists of data, by means of which the date the casting was produced or the casting production parameters thereof can be determined.

12. The method according to claim 11, wherein data stored in a database is assigned to the machine-readable information reproduced on the casting.

13. The method according to claim 12, wherein with each process step which the casting undergoes further readable data is assigned to data assigned in the database to the items of machine-readable information reproduced on the casting.

14. The method according to claim 1, wherein the casting mould is at least partly formed by cores consisting of a moulding material.

15. The method according to claim 14, wherein the identification element is inserted flush with adjacent areas into a surface of one of the cores.

* * * * *